US011716696B2

(12) United States Patent
Takahashi et al.

(10) Patent No.: US 11,716,696 B2
(45) Date of Patent: Aug. 1, 2023

(54) USER EQUIPMENT AND BASE STATION

(71) Applicant: NTT DOCOMO, INC., Tokyo (JP)

(72) Inventors: Hideaki Takahashi, Tokyo (JP); Hiromasa Umeda, Tokyo (JP); Kei Andou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/336,796

(22) PCT Filed: Jun. 1, 2017

(86) PCT No.: PCT/JP2017/020502
§ 371 (c)(1),
(2) Date: Mar. 26, 2019

(87) PCT Pub. No.: WO2018/061322
PCT Pub. Date: Apr. 5, 2018

(65) Prior Publication Data
US 2019/0223119 A1 Jul. 18, 2019

(30) Foreign Application Priority Data
Sep. 29, 2016 (JP) .................... 2016-192354

(51) Int. Cl.
*H04W 52/36* (2009.01)
*H04W 36/00* (2009.01)
(Continued)

(52) U.S. Cl.
CPC .......... *H04W 52/367* (2013.01); *H04B 1/04* (2013.01); *H04W 36/0085* (2018.08); *H04W 52/38* (2013.01); *H04W 74/08* (2013.01)

(58) Field of Classification Search
CPC ... H04W 52/00–60; H04W 36/00–385; H04W 52/04–60; H04W 52/367;
(Continued)

(56) References Cited

U.S. PATENT DOCUMENTS 8,886,247 B1 * 11/2014 Price .................... H04B 1/3838
370/318
2009/0124261 A1 * 5/2009 Shimomura ........ H04W 72/082
455/436
(Continued)

FOREIGN PATENT DOCUMENTS

GB 2411547 A * 8/2005 .......... H04W 52/281
GB 2411547 A 8/2005

OTHER PUBLICATIONS

3GPP TS 36.331 V13.4.0; "3rd Generation Partnership Project; Technical Specification Group Radio Access Network; Evolved Universal Terrestrial Radio Access (E-UTRA); Radio Resource Control (RRC); Protocol specification (Release 13)"; Dec. 2016 (629 pages).
(Continued)

*Primary Examiner* — Raymond S Dean
(74) *Attorney, Agent, or Firm* — Osha Bergman Watanabe & Burton LLP

(57) ABSTRACT

Provided is a power control technique for a user equipment that supports high transmission power. An aspect of the invention relates to user equipment that supports a first power class in a certain frequency band, the user equipment including a transceiver that transmits radio signals to and receives radio signals from a base station; and a transmission power controller that controls transmission power to the base station, wherein, upon accessing the base station in the frequency band provided with, as a default power class, a second power class that is lower than the first power class, the transmission power controller controls the transmission power in accordance with a regulation of the default power class, and the transmission power controller controls the transmission power so that the transmission power becomes
(Continued)

less than or equal to maximum output power of the default power class.

4 Claims, 10 Drawing Sheets

(51) Int. Cl.
   *H04B 1/04* (2006.01)
   *H04W 74/08* (2009.01)
   *H04W 52/38* (2009.01)
(58) Field of Classification Search
   CPC . H04W 52/38; H04W 36/0085; H04W 74/08; H04B 1/04
   See application file for complete search history.

(56) References Cited

U.S. PATENT DOCUMENTS

| | | | | |
|---|---|---|---|---|
| 2011/0081934 A1* | 4/2011 | Imamura | ............ | H04W 52/367 455/522 |
| 2012/0172079 A1* | 7/2012 | Baldemair | ............ | H04W 24/10 455/522 |
| 2013/0044708 A1* | 2/2013 | Kim | ................. | H04W 36/0072 370/329 |
| 2014/0105040 A1* | 4/2014 | Baker | ................. | H04W 52/367 370/252 |
| 2014/0198685 A1* | 7/2014 | Xu | ........................ | H04W 28/18 370/254 |
| 2014/0334354 A1* | 11/2014 | Sartori | ................. | H04L 5/1469 370/280 |
| 2015/0092670 A1 | 4/2015 | Makhlouf et al. | | |
| 2015/0341829 A1* | 11/2015 | Futaki | .................. | H04W 36/28 370/331 |
| 2017/0048809 A1* | 2/2017 | Takahashi | ............ | H04W 52/36 |
| 2017/0374574 A1* | 12/2017 | Lee | ........................ | H04W 24/08 |

OTHER PUBLICATIONS

3GPP TS 36.300 V13.6.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Dec. 2016 (314 pages).
Qualcomm Incorporated et al.; "Introduction of power class 2 HPUE in Band 41"; 3GPP TSG-RAN4 Meeting #80 R4-166914; Gothenburg, SE, Aug. 22-26, 2016 (17 pages).
Home Office et al.; "Motivation for new WI proposal: B3/B20 High Power UE"; 3GPP TSG-RAN WG4 Meeting #80 R4-166406; Gothenburg, Sweden, Aug. 22-26, 2016 (2 pages).
Motorola Solutions et al.; "New Work Item Proposal: Add Power Class 1 UE to B3/B20"; 3GPP TSG-RAN WG4 Meeting #80 R4-166407; Gothenburg, Sweden, Aug. 22-26, 2016 (6 pages).
Qualcomm Incorporated; "HPUE power class fallback"; 3GPP TSG-RAN WG4 #80 R4-166505; Gothenburg, SE, Aug. 22-26, 2016 (2 pages).
SoftBank; "HP-UE impacts to existing 2.5GHz networks"; 3GPP TSG-RAN WG4 Meeting #76 R4-153969; Beijing, China, Aug. 24-28, 2015 (3 pages).
3GPP TS 36.101 V14.0.0; "3rd Generation Partnership Project; Technical Specification Group Radio Access Network; Evolved Universal Terrestrial Radio Access (E-UTRA); User Equipment (UE) radio transmission and reception (Release 14)"; Jun. 2016 (1057 pages).
3GPP TS 36.101 V13.4.0; "3rd Generation Partnership Project; Technical Specification Group Radio Access Network; Evolved Universal Terrestrial Radio Access (E-UTRA); User Equipment (UE) radio transmission and reception (Release 13)"; Jun. 2016 (1035 pages).
International Search Report issued for PCT/JP2017/020502, dated Aug. 22, 2017 (3 pages).
Written Opinion issued for PCT/JP2017/020502, dated Aug. 22, 2017 (4 pages).
Extended European Search Report issued in counterpart European Patent Application No. 17855281.6, dated Apr. 29, 2020 (14 pages).
Office Action issued in European Application No. 17855281.6, dated Oct. 27, 2020 (7 pages).
3GPP TS 36.331 V14.0.0; "Release 14; 3rd Generation Partnership Project; Technical Specification Group Access Radio Network; Evolved Universal Terrestrial Radio Access (E-UTRA); Radio Resource Control (RRC); Protocol specification;" Sep. 2016; Sophia Antipolis Valbonne, France (644).
3GPP TS 36.101 V14.0.0; Release 14; "3rd Generation Partnership Project; Technical Specification Group Radio Access Network; Evolved Universal Terrestrial Radio Access (E-UTRA); User Equipment (UE) radio transmission and reception;" Jun. 2016; Sophia-Antipolis Cedex; France; pp. 23-303 (281 pages).
Office Action issued in the counterpart European Patent Application No. 17855281.6, dated May 14, 2021 (5 pages).
Office Action issued in Japanese Application No. 2018-541897; dated Apr. 13, 2021 (7 pages).
Office Action issued in Chinese Application No. 201780060246.X; dated Jul. 2, 2021 (11 pages).
Office Action issued in counterpart European Patent Application No. 17855281.6, dated Oct. 28, 2021 (7 pages).
Office Action issued in counterpart European Patent Application No. 17855281.6., dated Dec. 13, 2022 (5 pages).

* cited by examiner

FIG.10

For each supported frequency band, the UE shall:

1> if the UE supports a different power class than the default power class for the band and the supported power class enables the higher maximum output power than that of the default power class:

2> if the TDD frame configuration is 0 or 6; or

2> if the IE *P-Max* as defined in [7] is not provided; or

2> if the IE *P-Max* as defined in [7] is provided and set to the maximum output power of the default power class or lower;

3> apply all requirements for the default power class to the supported power class and set the configured transmitted power as specified in sub-clause 6.2.5;

2> else (i.e the IE *P-Max* as defined in [7] is provided and set to the higher value than the maximum output power of the default power class):

3> apply all requirements for the supported power class and set the configured transmitted power as specified in sub-clause 6.2.5;

[7] TS 36.331

USER EQUIPMENT AND BASE STATION

TECHNICAL FIELD

The present invention relates to a radio communication system.

BACKGROUND ART

In the third generation partnership project (3GPP), the allowance of transmission power higher than power class 3 (PC3) of 23 dBm, which is a default power class, has been discussed for a global band (for example, Band 41) and a user equipment that supports power class 2 (PC2) with a maximum transmission power of 26 dBm has been specified. This is to ensure the coverage of a service provider that uses Band 41 (a band of 2.5 GHz), which is a high-frequency band, as a main band. In addition, a user equipment that can use a high output is expected to be specified in the near future. For example, Global Band 3 or 28 is expected to be added to power class 1 (PC1) of 31 dBm.

PRIOR ART DOCUMENT

Non-Patent Document

Non-Patent Document 1: R4-166914
Non-Patent Document 2: R4-166406
Non-Patent Document 3: R4-166407
Non-Patent Document 4: R4-166505
Non-Patent Document 5: 3GPP TS 36.101 V14.0.0 (2016 June)

SUMMARY OF THE INVENTION

Problem to be Solved by the Invention

However, there are countries or regions in which transmission power higher than PC3 is not allowed according to domestic regulations. The countries include Japan. The use of the user equipment that supports PC1 or PC2 in the countries or the regions has been discussed. Currently, the default power class (for example, PC3) of the frequency band is not notified through system information and the base station is not capable of notifying the user equipment supporting PC1 or PC2 that only the transmission power equal to or less than PC3 is allowed. In addition, the base station is able to determine whether the user equipment supports transmission power higher than PC3 based on capability information acquired from the user equipment, and the base station is able to control the user equipment which supports PC1 or PC2 so that the transmission power is less than or equal to that of PC3. However, currently, the capability information is acquired after a radio resource control (RRC) connection. Accordingly, in a random access procedure prior to the RRC connection, the user equipment may output transmission power higher than that of PC3.

In 3GPP TS 36.101, the following is defined for a user equipment corresponding to PC2 that operates in Band 41: when an information element (IE) P-max is configured to 23 dBm or less in a cell and a time division duplex (TDD) frame configuration with a high uplink allocation ratio is 0 or 6, regulations for PC2 are not applicable, $P_{PowerClass}$ is reconfigured to 23 dBm, and regulations for PC3 are applied to the user equipment. That is, when the user equipment corresponding to PC2 has P-max that is equal to or less than 23 dBm or when the user equipment accesses a network to which a TDD frame configuration of 0 or 6 is applied, the user equipment is un able to operate according to PC2, and the user equipment is required to fall back from PC2 to PC3.

In view of the above-described problem, an object of the present invention is to provide a power control technique for user equipment supporting high transmission power.

Means for Solving the Problem

In order to solve the above-described problem, an aspect of the present invention relates to user equipment that supports a first power class in a certain frequency band, the user equipment including a transceiver that transmits radio signals to and receives radio signals from a base station; and a transmission power controller that controls transmission power to the base station, wherein, upon accessing the base station in the frequency band provided with, as a default power class, a second power class that is lower than the first power class, the transmission power controller controls the transmission power in accordance with a regulation of the default power class, and the transmission power controller controls the transmission power so that the transmission power becomes less than or equal to maximum output power of the default power class.

Advantage of the Invention

According to the present invention, a power control technique for user equipment supporting high transmission power can be provided.

BRIEF DESCRIPTION OF DRAWINGS

FIG. 10 is a diagram illustrating an example of signaling according to an embodiment of the invention.

EMBODIMENTS OF THE INVENTION

In the following, embodiments of the present invention are described with reference to the drawings.

The following embodiment discloses a user equipment that supports a power class (PC1 or PC2) higher than a default power class such as PC3. The following embodiment is described in brief. When accessing a base station in a frequency band having a power class lower than a high power class that is supported as a default power class, the user equipment performs a random access procedure for the base station, using transmission regulations for the default power class in the frequency band and transmission power that is equal to or less than the maximum transmission power of the default power class.

Specifically, when the maximum transmission power of the frequency band of an access destination is not notified by the base station through system information or a handover instruction, the user equipment performs control such that user equipment transmission power is the maximum transmission power of the default power class, according to the regulations for the default power class of the frequency band. In addition, in a case in which the maximum transmission power of the frequency band of the access destination is notified, when the notified maximum transmission power is in a high power class, the user equipment may perform control such that the user equipment transmission power is the maximum transmission power of the high power class according to the regulations for the high power class of the frequency band. When the notified maximum transmission power is a low power class, the user equipment may perform control such that the user equipment transmission power is the lower of the maximum transmission power of the low power class and the notified maximum transmission power according to the regulations for the low power class of the frequency band. However, examples of the transmission regulations for the user equipment defined for each power class of the frequency band include an adjacent channel leakage ratio (ACLR), adjacent channel selectivity (ACS), a reference sensitivity power level (REFSENS), a spectrum emission mask (SEM), and maximum power reduction (MPR) (Non-Patent Document 5).

According to the above-mentioned structure, the user equipment that supports the high power class can access the base station, using transmission power that is allowed by a cell of the base station, which is an access destination, and the transmission regulations.

Figure 1:
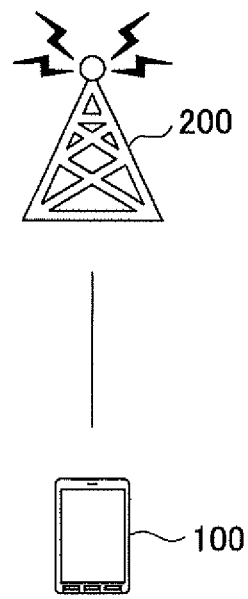
FIG. 1 is a diagram schematically illustrating a radio communication system according to an embodiment of the invention.

A radio communication system according to an embodiment of the invention is described with reference to FIG. 1. FIG. 1 is a diagram schematically illustrating the radio communication system according to the embodiment of the invention.

As illustrated in FIG. 1, a radio communication system 10 includes a user equipment 100 and a base station 200. The radio communication system 10 may be typically a radio communication system based on a 3rd generation partnership project (3GPP) standard, such as an LTE system, an LTE-Advanced system, or a 5G system. However, the radio communication system 10 according to the invention is not limited thereto and may be, for example, universal mobile telecommunications system (UMTS) or UMTS enhancement or may be a variation in the LTE system, such as an LTE single-cluster, an LTE multi-cluster, a UL inter-band CA, a UL intra-band contiguous CA, a UL intra-band non-contiguous CA, or Dual Connectivity. In the embodiment illustrated in FIG. 1, one base station 200 is illustrated. However, in practice, a plurality of base stations 200 that cover the service area of the radio communication system 10 are provided.

The user equipment 100 wirelessly communicates with the base station 200 through a cell or a frequency band that is provided by the base station 200 according to the 3GPP standard such as LTE, LTE-Advanced, and/or 5G. Typically, as illustrated in FIG. 1, the user equipment 100 may be any appropriate information processing device with a wireless communication function, such as a smart phone, a mobile phone, a tablet computer, a mobile router, or a wearable terminal.

The base station 200 establishes a wireless link to the user equipment 100 through a cell or a frequency band according to the 3GPP standard, such as LTE, LTE-Advanced, and/or 5G, to transmit a downlink (DL) packet, which has been received from a higher layer node and/or a server communicably connected to a core network (not depicted), to the user equipment 100, and the base station 200 transmits an uplink (UL) packet received from the user equipment 100 to the server.

Figure 2:
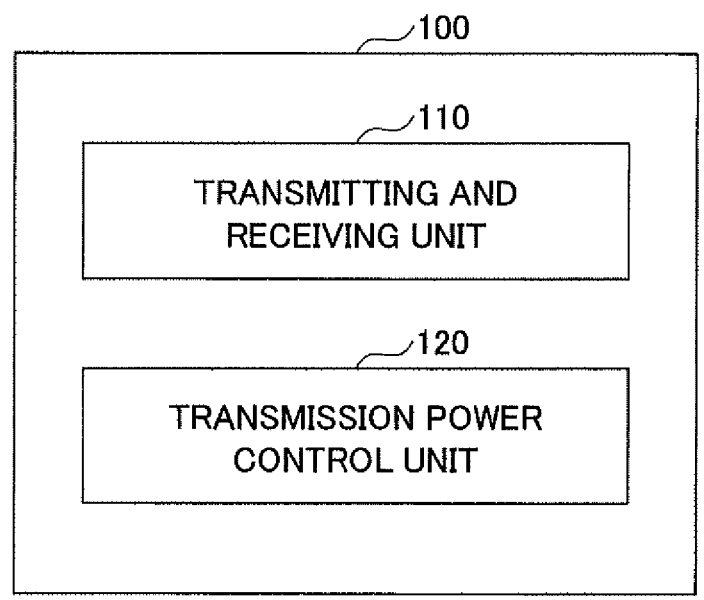
FIG. 2 is a block diagram illustrating the functional configuration of a user equipment according to an embodiment of the invention.

Next, the configuration of the user equipment according to the embodiment of the invention is described with reference to FIG. 2. FIG. 2 is a block diagram illustrating the functional configuration of the user equipment according to the embodiment of the invention.

As illustrated in FIG. 2, the user equipment 100 supports high transmission power, such as PC1 or PC2, in a certain frequency band and includes a transmitting and receiving unit 110 and a transmission power control unit 120.

The transmitting and receiving unit 110 transmits and receives radio signals to and from the base station 200. Specifically, the transmitting and receiving unit 110 transmits and receives various radio signals, such as those of uplink/downlink control channels and/or those of uplink/downlink data channels, to and from the base station 200.

The transmission power control unit 120 controls transmission power to the base station 200. In addition, when the user equipment 100 accesses the base station 200 in a frequency band having a power class, such as PC3, lower than a high power class, such as PC1 or PC2, as the default power class, the transmission power control unit 120 performs control such that transmission from the user equipment to the base station 200 is performed according to transmission regulations for the default power class of the frequency band and transmission power is equal to or less than the default power class. Specifically, when the user equipment 100 accesses the base station 200 through the frequency band in which a power class, such as PC3, lower than a high power class, such as PC1 or PC2, is applied as the default power class, the transmission power control unit 120 applies the default power class at the time a random access (RA) procedure for the base station 200 starts. For example, the transmission power control unit 120 determines the power class and/or the maximum transmission power applied in the frequency band on the basis of individual signaling or the system information received from the base station 200 and determines the power class to be applied in the frequency band when a connection request (RA preamble) is transmitted to the base station 200. The operation of the transmission power control unit 120 is described in detail below.

Figure 3:
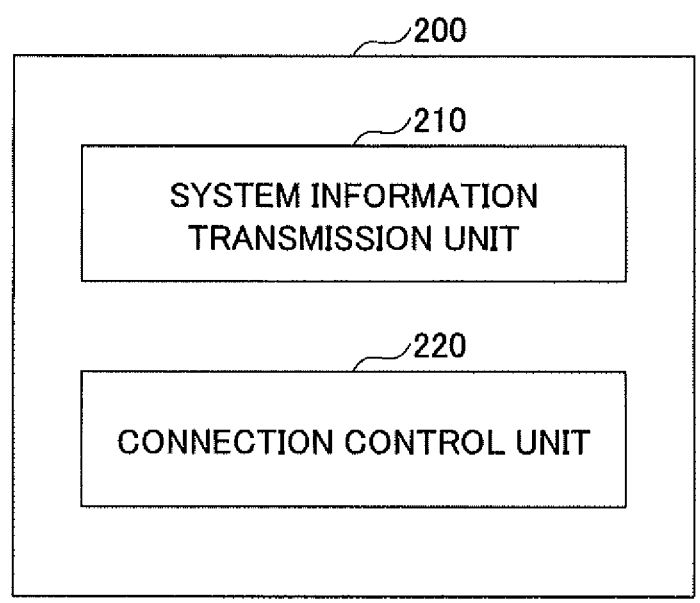
FIG. 3 is a block diagram illustrating the functional configuration of a base station according to an embodiment of the invention.

Next, the configuration of the base station according to the embodiment of the invention is described with reference to FIG. 3. FIG. 3 is a block diagram illustrating the functional configuration of the base station according to the embodiment of the invention.

As illustrated in FIG. 3, the base station 200 includes a system information transmission unit 210 and a connection control unit 220.

The system information transmission unit 210 transmits system information. The system information may include, for example, the maximum transmission power and/or the power class that is applied in the frequency band provided by the base station 200. Specifically, the system information transmission unit 210 periodically broadcasts the value of P-max or the power class applied in the frequency band, using System Information Block Type 1.

The connection control unit 220 controls a radio connection to the user equipment 100. Specifically, when an RA preamble is received from the user equipment 100, the connection control unit 220 transmits an RA response to the user equipment 100 to establish a radio connection or an RRC connection to the user equipment 100. After the radio connection is established, the connection control unit 220 performs, for example, mobility control to manage the radio connection to the user equipment 100 and notifies the user equipment 100 of the value of P-max or the power class applied in the frequency band, using individual signaling.

Next, a transmission power control process according to a first embodiment of the invention is described with reference to FIGS. 4 and 5. In the first embodiment, the transmission power control unit 120 controls the transmission regulations and the transmission power required to access the base station 200, according to the maximum transmission power (for example, P-max) notified by the base station 200.

In an embodiment, when information (for example, system information) related to the maximum transmission power (for example, 23 dBm) that is lower than a high power class, such as PC1 or PC2, in a certain frequency band is received from the base station 200 which is an access destination, the transmission power control unit 120 may control the transmitting and receiving unit 110 such that an access request to the frequency band is transmitted to the base station 200, which is the access destination, with the maximum transmission power, according to the transmission regulations for a low power class, such as PC3, in the frequency band.

Figure 4:
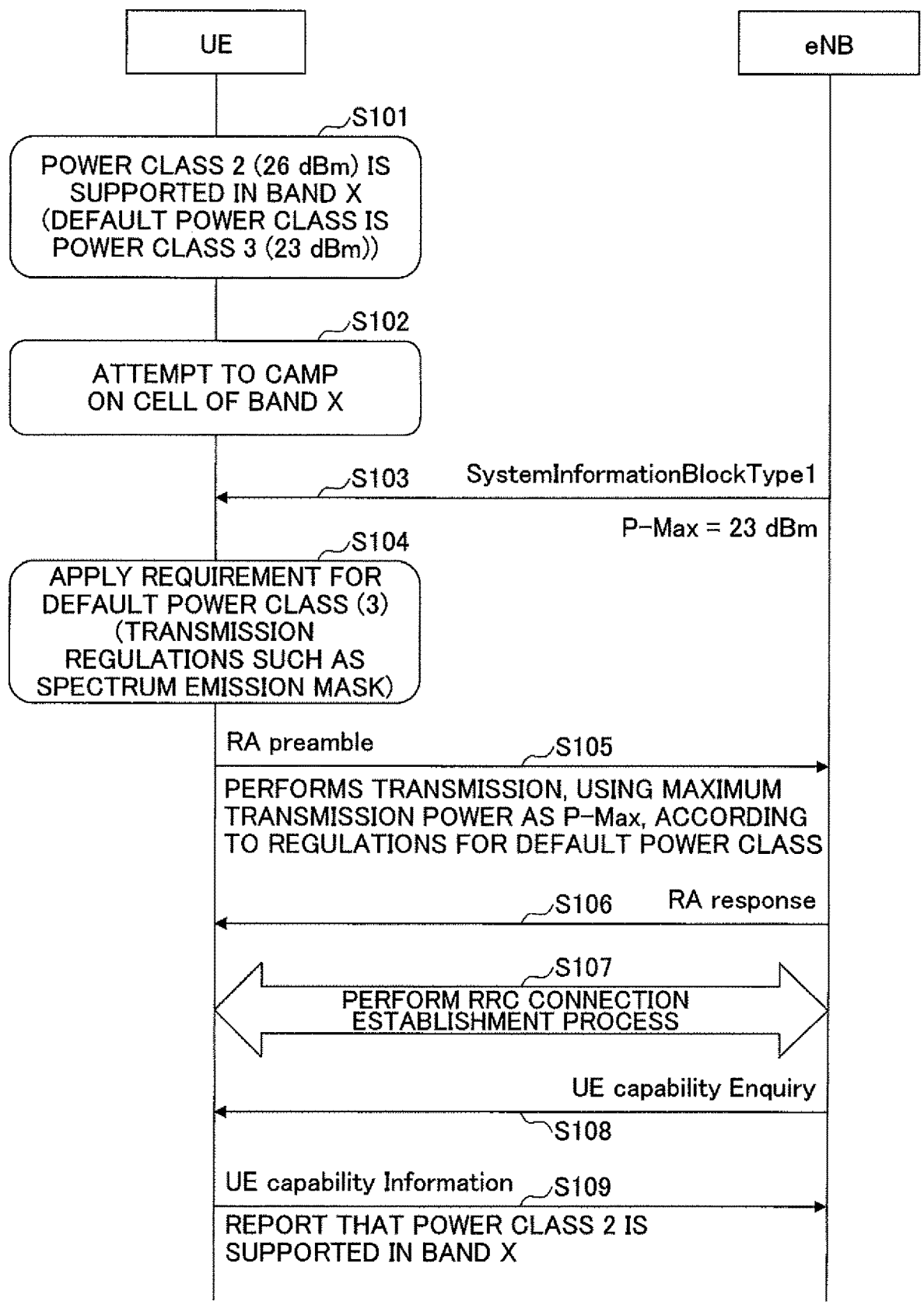
FIG. 4 is a sequence diagram illustrating an initial access process according to a first embodiment of the invention.

Specifically, as illustrated in FIG. 4, in Step S101, the user equipment 100 supports PC2 with a maximum transmission power of 26 dBm in a band X having PC3 with a maximum transmission power of 26 dBm as the default power class. In Step S102, the user equipment 100 tries to camp on the cell in the band X. In Step S103, the transmitting and receiving unit 110 receives System Information Block Type 1 indicating P-Max=23 dBm broadcasted from the system information transmission unit 210.

In Step S104, the transmission power control unit 120 compares a maximum transmission power of 26 dBm that is supported by the user equipment 100 with P-Max=23 dBm indicated by the system information and applies the transmission regulations (for example, Spectrum Emission Mask) for the default power class PC3, which has a low P-Max of 23 dBm in the band X, in the frequency band. In Step S105, the transmission power control unit 120 applies P-Max=23 dBm as the maximum transmission power on the basis of the regulations for PC3 and transmits a random access request (RA preamble) to the base station 200. In Step S106, the base station 200 returns an RA response to the RA request. In Step S107, the base station 200 establishes an RRC connection to the user equipment 100.

Then, in Step S108, the connection control unit 220 transmits UE capability Enquiry to the user equipment 100 in order to request capability information. In Step S109, the transmitting and receiving unit 110 notifies the base station 200 that the user equipment 100 supports PC2 with a higher power than PC3. When the notice is received and the notified PC2 is allowed, the connection control unit 220 may instruct the user equipment 100 to apply PC2. When the instruction to apply PC2 is received, for example, the user equipment 100 may perform the RA procedure for the cell with a maximum transmission power of 26 dBm, according to the regulations for PC2.

In another embodiment, when an instruction for a handover to a frequency band indicating the maximum transmission power (for example, 23 dBm) less than the high power class, such as PC1 or PC2, is received from a source base station 200, the transmission power control unit 120 may control the transmitting and receiving unit 110 such that an access request to the frequency band is transmitted to a target base station 200 with the maximum transmission power, according to the regulations for the low power class such as PC3.

Figure 5:
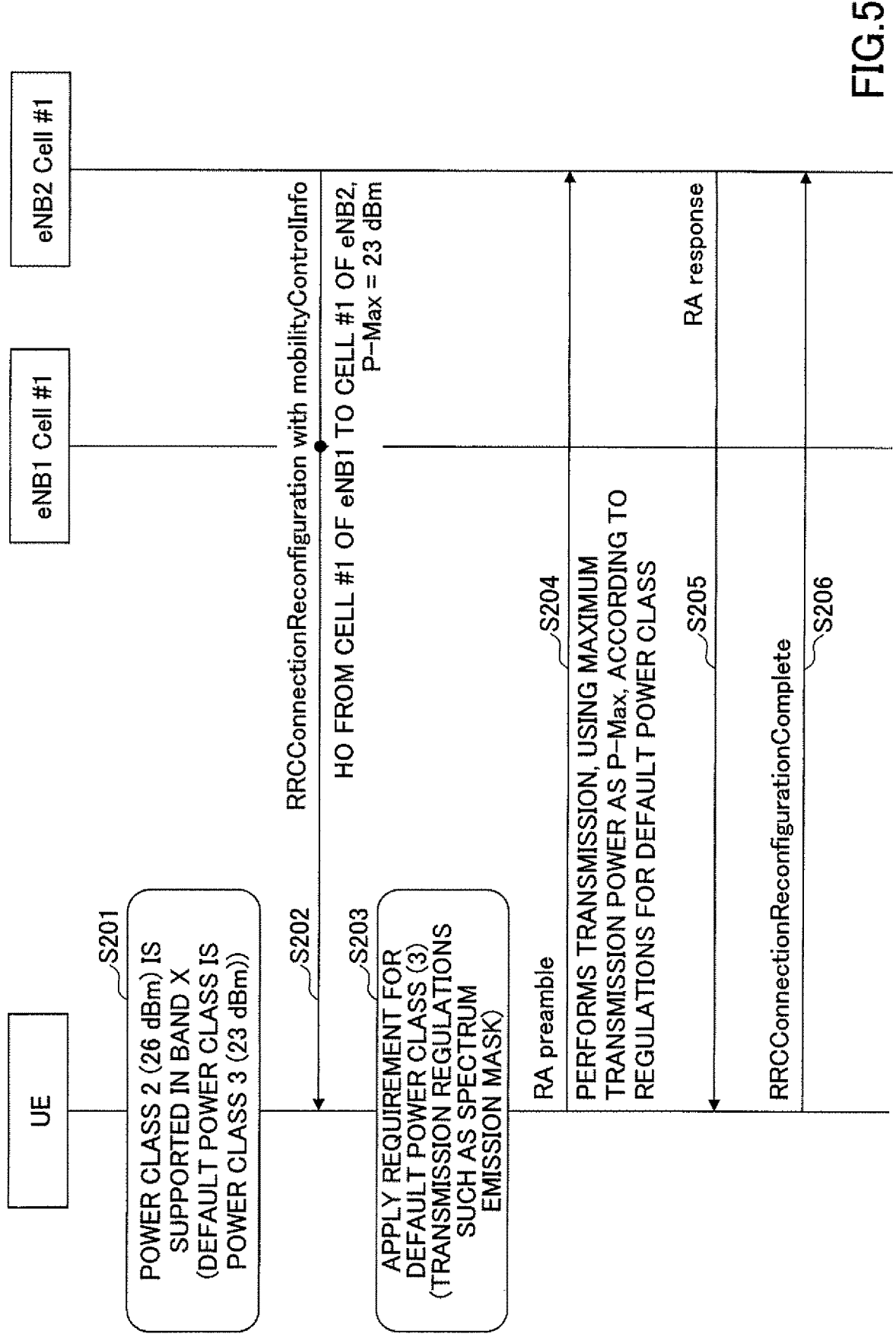
FIG. 5 is a sequence diagram illustrating a handover process according to the first embodiment of the invention.

Specifically, as illustrated in FIG. 5, in Step S201, the user equipment 100 supports PC2 with a maximum transmission power of 26 dBm in the band X having PC3 with a maximum transmission power of 23 dBm as the default power class. In Step S202, the user equipment 100 receives a handover instruction (RRC Connection Reconfiguration with mobility Control Info) from cell #1 of the source base station 200 to cell #1 of the target base station 200. Here, the handover instruction indicates P-Max=23 dBm.

In Step S203, the transmission power control unit 120 compares a maximum transmission power of 26 dBm that is supported by the user equipment 100 with P-Max=23 dBm indicated by the handover instruction and applies transmission regulations (for example, Spectrum Emission Mask) for the default power class PC3, which has a low P-Max of 23 dBm in the band X, in the frequency band. In Step S204, the transmission power control unit 120 applies P-Max=23 dBm as the maximum transmission power on the basis of the regulations for PC3 and transmits a random access request (RA preamble) to the base station 200. In Step S205, the base station 200 returns an RA response to the RA request. In Step S206, the user equipment 100 transmits a handover completion notice (RRC Connection Reconfiguration Complete) indicating that an RRC connection to the base station 200 has been established.

Next, a transmission power control process according to a second embodiment of the invention is described with reference to FIGS. 6 and 7. In the second embodiment, the transmission power control unit 120 controls transmission power required to access the base station 200 according to the power class notified by the base station 200.

In an embodiment, when information (for example, system information) related to the low power class, such as PC3, is received from the base station 200 which is an access destination, the transmission power control unit 120 may control the transmitting and receiving unit 110 such that an access request to the frequency band is transmitted to the base station 200, which is the access destination, with the lower of the low power class (PC3) and the maximum transmission power (P-max), according to the regulations for the low power class.

Figure 6:
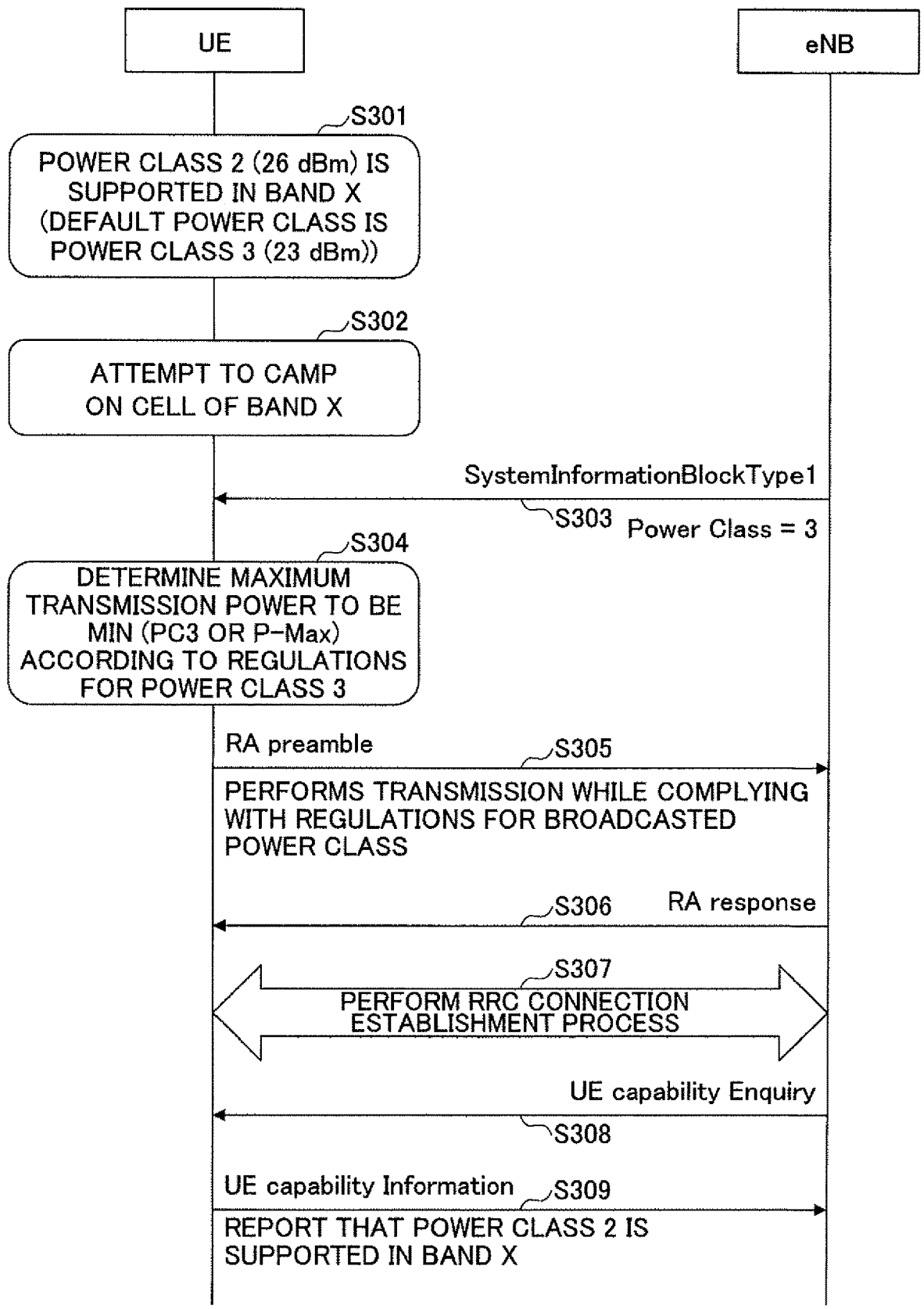
FIG. 6 is a sequence diagram illustrating an initial access process according to a second embodiment of the invention.

Specifically, as illustrated in FIG. 6, in Step S301, the user equipment 100 supports PC2 with a maximum transmission power of 26 dBm in a band X having PC3 with a maximum transmission power of 26 dBm as the default power class. In Step S202, the user equipment 100 tries to camp on the cell in the band X. In Step S203, the transmitting and receiving unit 110 receives System Information Block Type 1 indicating the power class PC3 broadcasted from the system information transmission unit 210.

In Step S304, the transmission power control unit 120 compares the maximum transmission power (23 dBm) of PC3 with P-Max and applies the lower of the low power class (PC3) and the maximum transmission power (P-max) in the frequency band according to transmission regulations (for example, Spectrum Emission Mask) for PC3 in the band X. In Step S305, the transmission power control unit 120 transmits a random access request (RA preamble) to the base station 200 with the determined transmission power, according to the transmission regulations for PC3. In Step S306, the base station 200 returns an RA response to the RA request. In Step S307, the base station 200 establishes an RRC connection to the user equipment 100.

Then, in Step S308, the connection control unit 220 transmits UE capability Enquiry to the user equipment 100 in order to request capability information. In Step S309, the transmitting and receiving unit 110 notifies the base station 200 that the user equipment 100 supports PC2 with a higher power than PC3. When the notice is received and the notified PC2 is allowed, the connection control unit 220 may instruct the user equipment 100 to apply PC2. When the instruction to apply PC2 is received, for example, the user equipment 100 may perform the RA procedure for the cell with a maximum transmission power of 26 dBm, according to the regulations for PC2.

In another embodiment, when an instruction for a handover to a frequency band indicating a low power class, such as PC3, is received from a source base station 200, the transmission power control unit 120 may control the transmitting and receiving unit 110 such that an access request to the frequency band is transmitted to a target base station 200 with the lower of the low power class (PC3) and the maximum transmission power (P-max), according to the regulations for the low power class.

Figure 7:
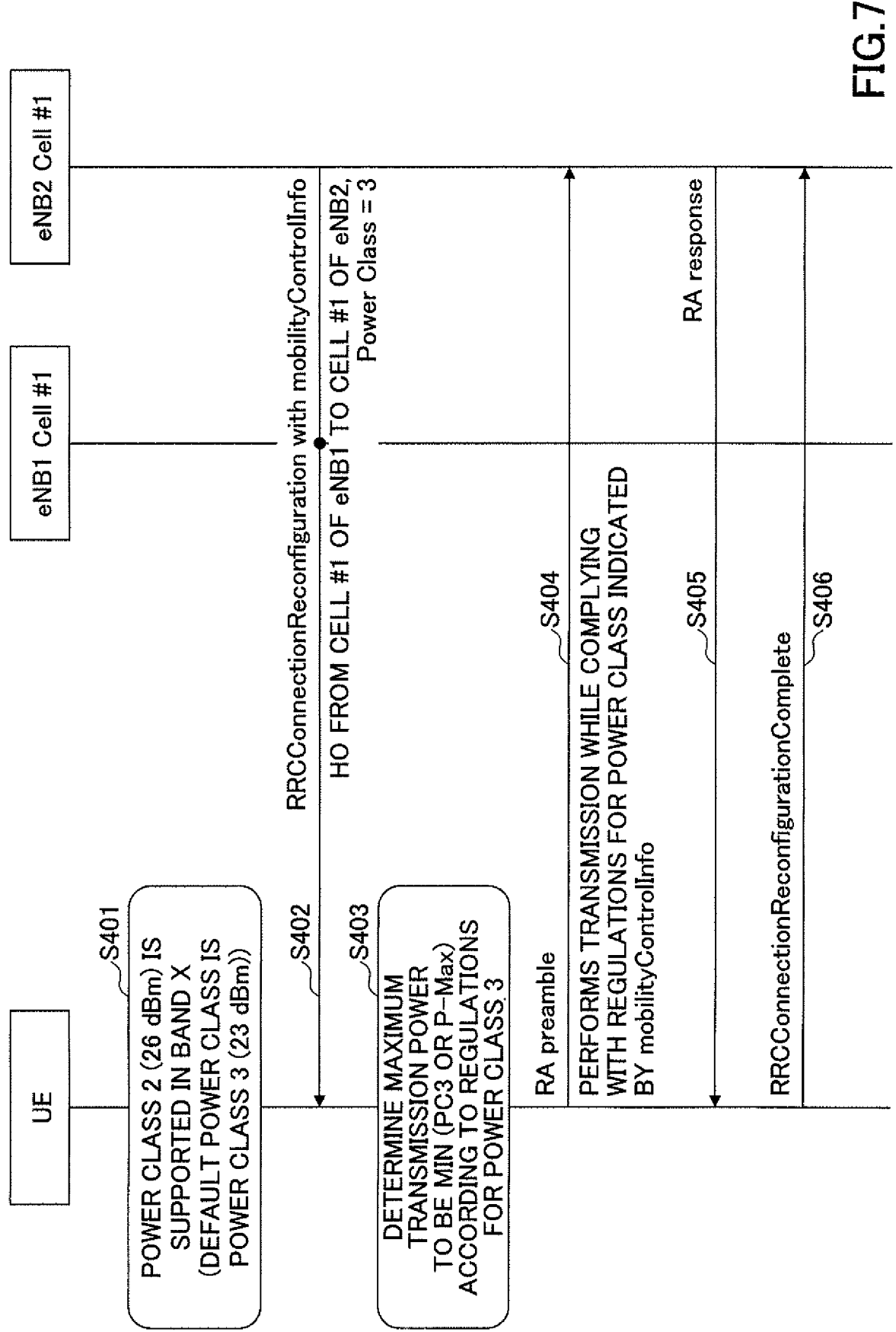
FIG. 7 is a sequence diagram illustrating a handover process according to the second embodiment of the invention.

Specifically, as illustrated in FIG. 7, in Step S401, the user equipment 100 supports PC2 of 26 dBm in the band X having PC3 of 23 dBm as the default power class. In Step S402, the user equipment 100 receives a handover instruction (RRC Connection Reconfiguration with mobility Control Info) from cell #1 of the source base station 200 to cell #1 of the target base station 200. Here, the handover instruction indicates that cell #1 of the target base station 200 is in the power class PC3.

In Step S403, the transmission power control unit 120 compares the maximum transmission power (26 dBm) of PC3 with P-Max and applies the lower of the low power class (PC3) and the maximum transmission power (P-max) in the frequency band according to the transmission regulations (for example, Spectrum Emission Mask) for PC3 in the band X. In Step S404, the transmission power control unit 120 transmits a random access request (RA preamble) to the base station 200 with the determined transmission power, according to the transmission regulations for PC3. In Step S405, the base station 200 returns an RA response to the RA request. In Step S406, the base station 200 transmits a handover completion notice (RRC Connection Reconfiguration Complete) indicating that an RRC connection to the base station 200 has been established.

Next, a transmission power control process according to a third embodiment of the invention is described with reference to FIGS. 8 to 10. In general, when the default power class (for example, 23 dBm of PC3) is allowed in a certain frequency band, the information element P-max is not broadcasted in the frequency band through system information and the information element P-max is broadcasted only in a specific area, such as a hospital, in which the maximum transmission power is lower than the default power class. Therefore, in a network in which a power class (for example, 31 dBm of PC1 or 26 dBm of PC2) higher than the default power class is not allowed, it is not preferable to broadcast the information element P-max. In the third embodiment, when the maximum transmission power of a certain frequency band is not notified, the transmission power control unit 120 may control the transmission power of the user equipment such that the transmission power is the maximum transmission power of the default power class, according to the transmission regulations for the default power class of the frequency band. When the maximum transmission power of the frequency band is notified and the notified maximum transmission power is in the high power class, the transmission power control unit 120 may control the transmission power of the user equipment such that the transmission power is the maximum transmission power of the high power class, according to the transmission regulations for the high power class of the frequency band. When the maximum transmission power of the frequency band is notified and the notified maximum transmission power is in the default power class, the transmission power control unit 120 may control the transmission power of the user equipment such that the transmission power is the lower of the default power class and the maximum transmission power, according to the transmission regulations for the high power class of the frequency band.

Figure 8:
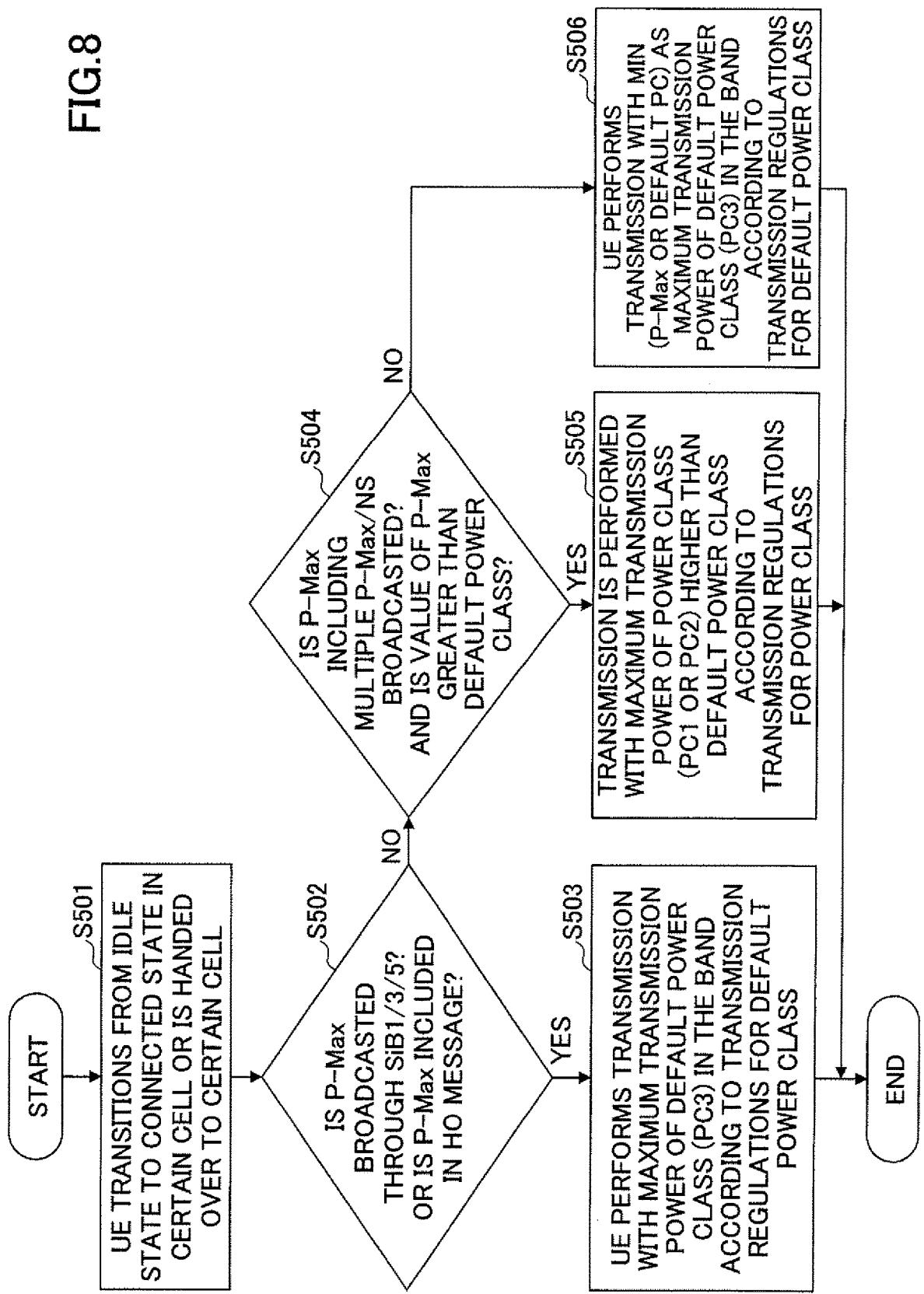
FIG. 8 is a flowchart illustrating a transmission power control process performed by the user equipment according to a third embodiment of the invention.

FIG. 8 is a flowchart illustrating the transmission power control process performed by the user equipment according to the third embodiment of the invention. As illustrated in FIG. 8, in Step S501, the user equipment 100 changes from an idle state to a connected state in a cell having PC3 as the default power class or is handed over to the cell. In Step S502, the user equipment 100 determines whether the maximum transmission power P-max has been notified through the system information (for example, SIB1, SIB3, or SIB5) of the cell or the maximum transmission power P-max has been notified through a handover message.

When the maximum transmission power P-max in a certain frequency band has been notified (S502: Yes), in Step S503, the user equipment 100 transmits an uplink signal including a connection request (RA preamble) to the base station 200 with the maximum transmission power of PC3 according to the transmission requirements of the default power class (PC3) of the frequency band.

On the other hand, when the maximum transmission power P-max has not been notified (S502: No), in Step S504, the user equipment 100 determines whether P-max including multiple P-max/NS has been broadcasted and the value of P-max is greater than the default power class.

When P-max including multiple P-max/NS has been broadcasted and the value of P-max is greater than the default power class (S504: Yes), in Step S505, the user equipment 100 transmits an uplink signal including a connection request (RA preamble) to the base station 200 with the maximum transmission power of the high power class (PC1 or PC2) according to the transmission requirements of the high power class of the frequency band.

On the other hand, when P-max including multiple P-max/NS has not been broadcasted and the value of P-max is equal to or less than the default power class (S504: No), in Step S506, the user equipment 100 transmits an uplink signal including a connection request (RA preamble) to the base station 200 with the lower of P-max and the default power class (PC3) according to the transmission requirements of the default power class of the frequency band.

Figure 9:
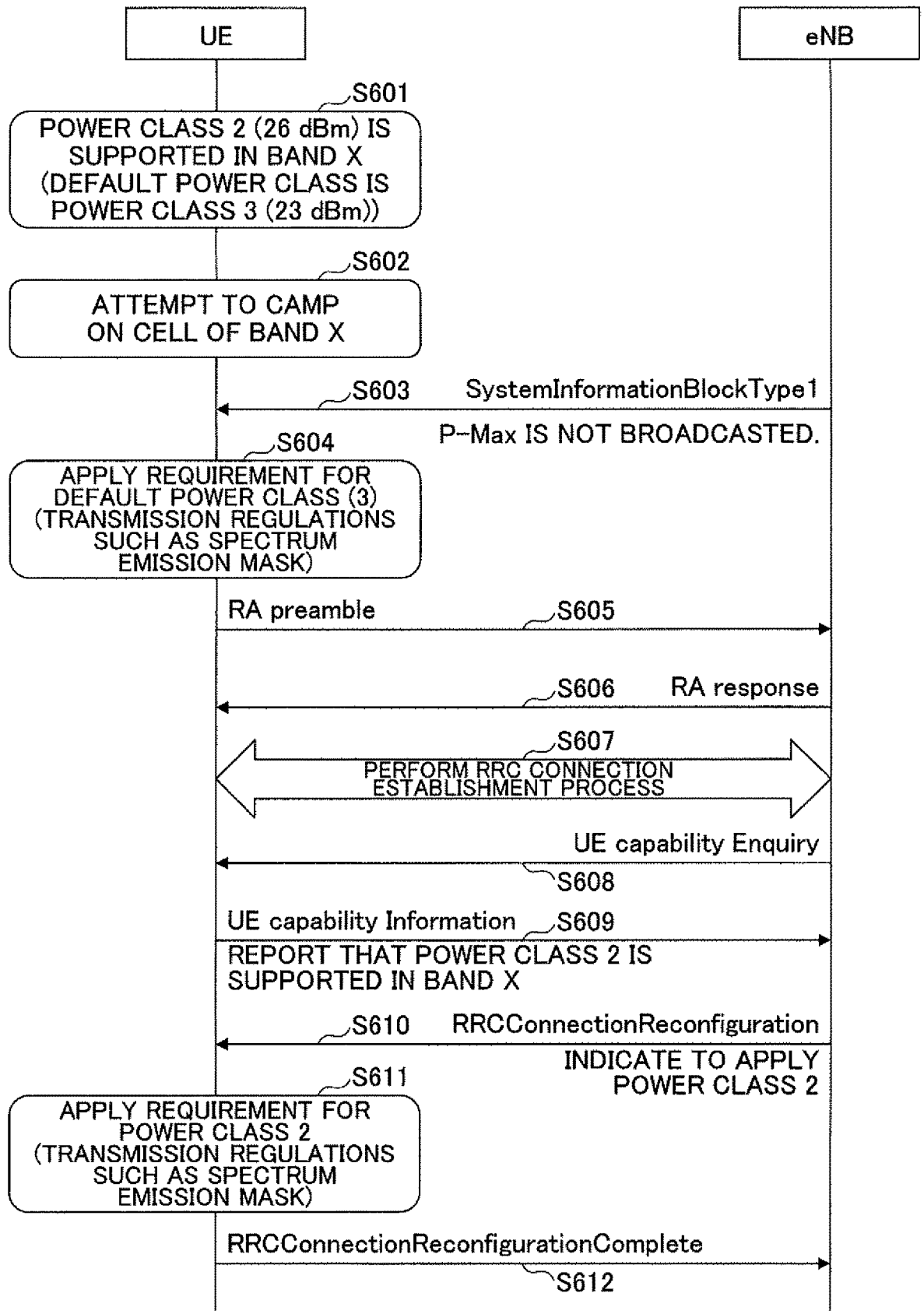
FIG. 9 is a sequence diagram illustrating an initial access process according to the third embodiment of the invention.

FIG. 9 is a sequence diagram illustrating an initial access process according to the third embodiment of the invention. In the example illustrated in FIG. 9, a case in which P-max is not notified through the system information is described.

As illustrated in FIG. 9, in Step S601, the user equipment 100 supports PC2 of 26 dBm in the band X having PC3 of 23 dBm as the default power class. In Step S602, the user equipment 100 tries to camp on a cell in the band X. In Step S603, the transmitting and receiving unit 110 receives System Information Block Type 1 broadcasted from the system information transmission unit 210. In this example, it is assumed that the information element P-max is not notified through the system information.

In Step S604, the transmission power control unit 120 applies the transmission regulations (for example, Spectrum Emission Mask) for the default power class PC3 of the band X in the frequency band. In Step S605, the transmission power control unit 120 applies P-Max=23 dBm as the maximum transmission power on the basis of the transmission regulations for PC3 and transmits a random access request (RA preamble) to the base station 200. In Step S606, the base station 200 returns an RA response to the RA request. In Step S607, the base station 200 establishes an RRC connection to the user equipment 100.

Then, in Step S608, the connection control unit 220 transmits UE capability Enquiry to the user equipment 100 in order to request capability information. In Step S609, the transmitting and receiving unit 110 notifies the base station 200 that the user equipment 100 supports PC2 with a higher power than PC3.

In Step S610, the connection control unit 220 instructs the user equipment 100 to apply PC2, using RRC Connection Reconfiguration. In Step S611, the user equipment 100 applies the regulations for PC2. In Step S612, the user equipment 100 transmits RRC Connection Reconfiguration Complete to the base station 200. In this embodiment, the user equipment 100 may perform the transmission power control process described with reference to FIG. 8, regardless of the notified UE capability.

FIG. 10 is a diagram illustrating an example of signaling according to an embodiment of the invention. As illustrated in FIG. 10, when the user equipment 100 supports a power class (PC1 or PC2) higher than the default power class (PC3) in a certain frequency band, when a predetermined TDD frame configuration (for example, TDD frame configuration 0 or 6) is applied in the frequency band of an access destination; when the maximum transmission power of the frequency band is not notified by the base station 200, or when the maximum transmission power of the frequency band is equal to or less than the default power class, the transmission power control unit 120 may apply the transmission regulations for the default transmission power class of the frequency and may configure predetermined transmission power.

The block diagrams used to describe the above-mentioned embodiments illustrate functional unit blocks. The functional blocks (components) are implemented by an arbitrary combination of hardware and/or software. In addition, a means for implementing each functional block is not particularly limited. That is, each functional block may be implemented by one device that is physically and/or logically coupled or by a plurality of devices that are physically and/or logically separated from each other and are connected directly and/or indirectly (for example, in a wired manner and/or wirelessly).

For example, the user equipment 100 and the base station 200 according to the embodiment of the invention may function as a computer that performs the processes of a wireless communication method according to the invention. FIG. 13 is a block diagram illustrating the hardware configuration of the user equipment 100 and the base station 200 according to the embodiment of the invention. Each of the user equipment 100 and the base station 200 may be physically configured as a computer device including, for example, a processor 1001, a memory 1002, a storage 1003, a communication device 1004, an input device 1005, an output device 1006, and a bus 1007.

Figure 11:
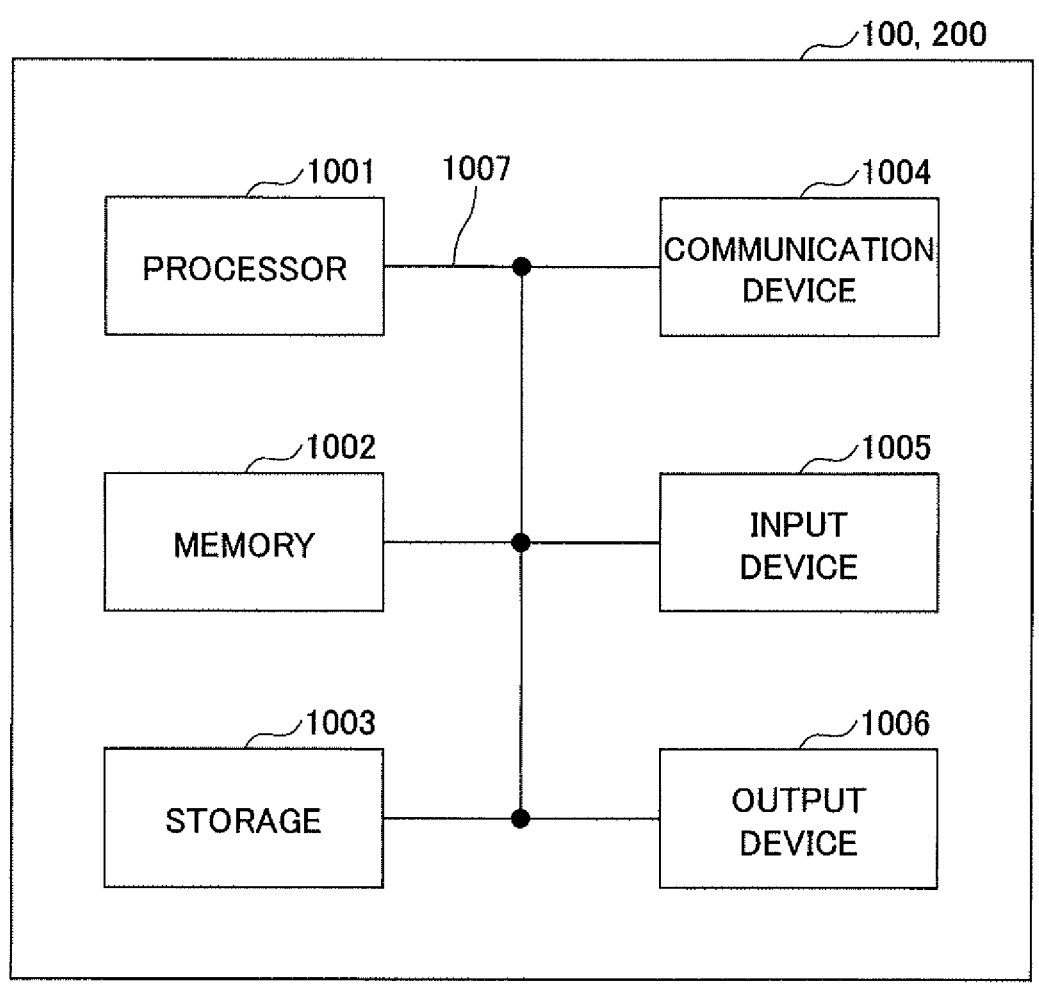
FIG. 11 is a block diagram illustrating the hardware configuration of a user equipment and a base station according to an embodiment of the invention.

In the following description, the term "device" can be substituted with, for example, a circuit, an apparatus, and a unit. The hardware configuration of the user equipment 100 and the base station 200 may include one or a plurality of devices illustrated in FIG. 11 or may not include some of the devices.

Each function of the user equipment 100 and the base station 200 may be implemented by the following process: predetermined software (program) is read onto hardware, such as the processor 1001 or the memory 1002, and the processor 1001 performs an operation to control the communication of the communication device 1004 or the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, each of the above-mentioned components may be implemented by the processor 1001.

The processor 1001 reads a program (program code), a software module, or data from the storage 1003 and/or the communication device 1004 to the memory 1002 and performs various types of processes according to the program, the software module, or the data. A program that causes a computer to perform at least some of the operations described in the embodiments is used as the program. For example, the processes performed by each component of the user equipment 100 and the base stations 200 and 201 may be implemented by a control program that is stored in the memory 1002 and is executed by the processor 1001. Other functional blocks may be implemented by the same method as described above. In this embodiment, the above-mentioned various processes are performed by one processor 1001. However, the processes may be simultaneously or sequentially performed by two or more processors 1001. The processor 1001 may be mounted with one or more chips. The program may be transmitted from the network through an electric communication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may also be referred to as, for example, a register, a cache, or a main memory (main storage device). The memory 1002 can store, for example, a program (program code) and a software module that can be executed to perform the wireless communication method according to the embodiment of the invention.

The storage 1003 is a computer-readable recording medium and may include, for example, at least one of an optical disk, such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may also be referred to as an auxiliary storage device. The above-mentioned storage medium may be, for example, a database, a server, and other proper media including the memory 1002 and/or the storage 1003.

The communication device 1004 is hardware (transmitting and receiving device) for communicating with the computer through a wired and/or wireless network and is also referred to as, for example, a network device, a network controller, a network card, or a communication module. For example, each of the above-mentioned components may be implemented by the communication device 1004.

The input device 1005 is an input unit (for example, a keyboard, a mouse, a microphone, a switch, a button, or a sensor) that receives an input from the outside. The output device 1006 is an output device (for example, a display, a speaker, or an LED lamp) that performs an output process to the outside. The input device 1005 and the output device 1006 may be integrated with each other (for example, a touch panel).

All of the devices, such as the processor 1001 and the memory 1002, are connected to each other by the bus 1007 for information communication. The bus 1007 may be a single bus or the devices may be connected to each other by different buses.

The user equipment 100 and the base station 200 may include hardware, such as a microprocessor, a digital signal processor (DSP), an application specific integrated circuit (ASIC), a programmable logic device (PLD), and a field programmable gate array (FPGA), or some or all of the functional blocks may be implemented by the hardware. For example, the processor 1001 may be mounted with at least one of these hardware components.

The notification of information is not limited to the aspects/embodiments described in the specification and may be performed by other methods. For example, the notification of information may be performed by physical layer signaling (for example, downlink control information (DCI) and uplink control information (UCI)), higher layer signaling (for example, radio resource control (RRC) signaling, medium access control (MAC) signaling, and broadcast information (a master information block (MIB) and a system information block (SIB))), other signals, or combinations thereof. The RRC signaling may also be referred to as an RRC message and may be, for example, an RRC connection setup message or an RRC connection reconfiguration message.

Each aspect/embodiment described in the specification may be applied to systems using long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and other proper systems and/or next-generation systems that are extended on the basis of these systems.

In each aspect/embodiment described in the specification, for example, the order of the processes in the procedure, the sequence, and the flowchart may be changed as long as there is no contraction between the processes. For example, for the method described in the specification, elements of various steps are presented in the exemplified order. However, the invention is not limited to the presented specific order.

In the specification, in some cases, a specific operation performed by the base station 200 is performed by an upper node of the base station. In a network having one or a plurality of network nodes including the base station, it is apparent that various operations performed for communication with a terminal can be performed by the base station and/or a network node (for example, MME or S-GW is considered and the network node is not limited thereto) other than the base station. In the above-mentioned example, one network node is provided other than the base station. However, a plurality of other network nodes (for example, MME and S-GW) may be combined with each other.

For example, information can be output from a higher layer (or a lower layer) to a lower layer (or a higher layer). Information may be input and output through a plurality of network nodes.

For example, the input and output information may be stored in a specific place (for example, a memory) or may be managed by a management table. For example, the input and output information can be overwritten, updated, or additionally written. For example, the output information may be deleted. For example, the input information may be transmitted to other devices.

Determination may be performed by a one-bit value (0 or 1), a Boolean value (true or false), or the comparison between values (for example, comparison with a predetermined value).

The aspects/embodiments described in the specification may be independently used, may be combined with each other, or may be changed in association with execution. The notification of predetermined information (for example, "notification that the predetermined information is X") is not limited to explicit notification and may be implicit notification (for example, the predetermined information is not notified).

The invention has been described in detail above. It is apparent to those skilled in the art that the invention is not limited to the embodiments described in the specification. Various modifications and changes of the invention can be made without departing from the scope and spirit of the invention which are defined by the claims. Therefore, the specification is illustrative and does not limit the invention.

Software can be construed broadly to mean, for example, a command, a command set, a code, a code segment, a program code, a program, a sub-program, a software module, an application, a software application, a software package, a routine, a sub-routine, an object, an executable file, an execution thread, a procedure, and a function, regardless of whether it is referred to as software, firmware, middleware, a microcode, a hardware description language, or other names.

For example, software and commands may be transmitted and received through a transmission medium. For example, when software is transmitted from a website, a server, or other remote sources by a wired technique, such as a coaxial cable, an optical fiber cable, a twisted pair cable, and a digital subscriber line (DSL), and/or a radio technique, such as infrared rays, radio waves, and microwaves, the wired technique and/or the radio technique is included in the definition of the transmission medium.

For example, the information and the signals described in the specification may be represented by any of various different techniques. For example, data, a command, an instruction, information, a signal, a bit, a symbol, and a chip that can be mentioned in the entire description may be represented by a voltage, a current, electromagnetic waves, a magnetic field or magnetic particles, an optical field or a photon, or arbitrary combinations thereof.

The terms described in the specification and/or the terms required for the understanding of the specification may be substituted with the terms with the same or similar meaning. For example, a channel and/or a symbol may be a signal. In addition, a signal may be a message. A component carrier (CC) may be referred to as a carrier frequency or a cell.

The terms "system" and "network" used in the specification are interchangeably used.

For example, the information and the parameters described in the specification may be represented by absolute values, the relative values of predetermined values, or other corresponding information. For example, a radio resource may be indicated by an index.

The above-mentioned parameters may have any names. In some cases, for example, numerical expressions using these parameters are different from the expressions that are explicitly disclosed in the specification. All of various channels (for example, PUCCH and PDCCH) and information elements (for example, TPC) can be identified by proper names. Therefore, various names may be allocated to the various channels and information elements.

The base station can accommodate one or a plurality of (for example, three) cells (also referred to as sectors). When the base station accommodates a plurality of cells, the entire coverage area of the base station may be divided into a plurality of small areas and a communication service may be provided to each of the small areas by a base station sub-system (for example, a small indoor remote radio head (RRH)). The term "cell" or "sector" indicates a portion or the entire coverage area of the base station and/or the base station sub-system that provides the communication service in the coverage. The terms "base station", "eNB", "cell", and "sector" can be interchangeably used in the specification. In some cases, the base station is referred to as a fixed station, NodeB, eNodeB (eNB), an access point, a femtocell, or a small cell.

In some cases, a mobile station is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other proper terms according to operators.

In some cases, the terms "determining" and "determining" used in the specification include various operations. The terms "determining" and "deciding" can include, for example, "determination" and "decision" for calculating, computing, processing, deriving, investigating, looking-up (for example, looking-up in a table, a database, or other data structures), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. In the specification, it can be considered that two elements are "connected" or "coupled" to each other by using one or more electric wires, a cable, and/or a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

The term "on the basis of" used in the specification does not mean "on the basis of only" unless otherwise stated. In other words, the term "on the basis of" means both "on the basis of only" and "on the basis of at least".

Any reference to elements with the names "first" and "second" used in the specification does not generally limit the number of elements or the order of the elements. These names can be used as a convenient method for distinguishing two or more elements in the specification. Therefore, a reference to the first and second elements does not mean that only two elements can be used or that the first element needs to precede the second element in some form.

The term "means" in the configuration of each of the above-mentioned devices may be substituted with, for example, a "unit", a "circuit", or a "device".

The terms "include" and "including" and the modifications thereof are intended to be inclusive, similarly to the term "comprising", as long as they are used in the specification or the claims. In addition, the term "or" used in the specification or the claims does not mean exclusive OR.

A radio frame may include one or a plurality of frames in the time domain. One frame or each of a plurality of frames in the time domain may be referred to as a subframe. The subframe may include one or a plurality of slots in the time domain. The slot may include one or a plurality of symbols (for example, OFDM symbols or SC-FDMA symbols) in the time domain. Each of the radio frame, the subframe, the slot, and the symbol indicates a time unit when a signal is transmitted. The radio frame, the subframe, the slot, and the symbol may have different names. For example, the LTE system performs scheduling in which a base station allocates radio resources (for example, a frequency bandwidth or transmission power that can be used in each mobile station) to each mobile station. The minimum time unit of the scheduling may be referred to as a transmission time interval (TTI). For example, one subframe may be referred to as TTI, a plurality of continuous subframes may be referred to as TTI, or one slot may be referred to as TTI. A resource block (RE) is the unit of resource allocation in the time domain and the frequency domain. In the frequency domain, the resource block may include one or a plurality of continuous subcarriers. In the time domain of the resource block, the resource block may include one or a plurality of symbols and may be the length of one slot, one subframe, or one TTI. One TTI or one subframe may include one or a plurality of resource blocks. The configuration of the radio frame is just an example and the number of subframes in the radio frame, the number of slots in the subframe, the number of symbols and resource blocks in the slot, and the number of subcarriers in the resource block can be changed in various ways.

The embodiments of the invention are described in detail above. The invention is not limited to the above-described specific embodiments and various modifications and changes of the invention can be made, without departing from the scope and spirit of the invention described in the claims.

This patent application is based on and claims priority to Japanese Patent Application No. 2016-192354 filed on Sep. 29, 2016, and the entire content of Japanese Patent Application No. 2016-192354 is incorporated herein by reference.

LIST OF REFERENCE SYMBOLS

10 radio communication system
100 user equipment
200 base station

The invention claimed is:

1. A terminal comprising:
a transceiver that transmits radio signals to and receives radio signals from a base station; and
a controller that controls maximum transmission power to be less than or equal to maximum transmission power of a default power class by applying a regulation of the default power class to a supported first power class, upon transmitting a radio signal to the base station in a frequency band for which a second power class that is lower than the supported first power class is specified as the default power class,
wherein the controller detects whether maximum transmission power of the frequency band is reported from the base station,
wherein, upon detecting that an information element P-Max indicating the maximum transmission power of the frequency band is not included in system information received from the base station prior to establishing a Radio Resource Control (RRC) connection with the base station, the controller controls transmission power for transmitting a random access preamble prior to establishing the RRC connection to be less than or equal to the maximum transmission power of the default power class by applying the regulation of the default power class to the supported first power class, and
wherein, upon detecting that an information element P-Max indicating the maximum transmission power of the frequency band is included in system information received from the base station prior to establishing an RRC connection with the base station and a value higher than the maximum transmission power of the default power class is set to the P-Max, the controller controls transmission power for transmitting a random access preamble prior to establishing the RRC connection to be less than or equal to a maximum transmission power of the supported first power class by applying a regulation of the supported first power class.

2. The terminal according to claim 1, wherein, upon detecting that the maximum transmission power in the frequency band is reported and that the reported maximum transmission power is the maximum transmission power of the default power class, the controller controls, in accordance with the regulation of the default power class in the frequency band, the maximum transmission power from the terminal to be the lower one of the maximum transmission power of the supported first power class and the reported maximum transmission power.

3. A communication method by a terminal, the method comprising:
transmitting radio signals to and receiving radio signals from a base station;
controlling maximum transmission power to be less than or equal to maximum transmission power of a default power class by applying a regulation of the default power class to a supported first power class, upon transmitting a radio signal to the base station in a frequency band for which a second power class that is lower than the supported first power class is specified as the default power class; and
detecting whether maximum transmission power of the frequency band is reported from the base station,
wherein, upon detecting that an information element P-Max indicating the maximum transmission power of the frequency band is not included in system information received from the base station prior to establishing a Radio Resource Control (RRC) connection with the base station, the controlling controls transmission power for transmitting a random access preamble prior to establishing the RRC connection to be less than or equal to the maximum transmission power of the default power class by applying the regulation of the default power class to the supported first power class, and
wherein, upon detecting that an information element P-Max indicating the maximum transmission power of the frequency band is included in system information received from the base station prior to establishing an RRC connection with the base station and a value higher than the maximum transmission power of the default power class is set to the P-Max, the controlling controls transmission power for transmitting a random access preamble prior to establishing the RRC connection to be less than or equal to a maximum transmission power of the supported first power class by applying a regulation of the supported first power class.

4. A radio communication system comprising:
a base station that communicates with a terminal; and
the terminal,
wherein the terminal includes:
a transceiver that transmits radio signals to and receives radio signals from a base station; and
a controller that controls maximum transmission power to be less than or equal to maximum transmission power of a default power class by applying a regulation of the default power class to a supported first power class, upon transmitting a radio signal to the base station in a frequency band for which a second power class that is lower than the supported first power class is specified as the default power class,
wherein the controller detects whether maximum transmission power of the frequency band is reported from the base station,
wherein, upon detecting that an information element P-Max indicating the maximum transmission power of the frequency band is not included in system information received from the base station prior to establishing a Radio Resource Control (RRC) connection with the base station, the controller controls transmission power for transmitting a random access preamble prior to establishing the RRC connection to be less than or equal to the maximum transmission power of the default power class by applying the regulation of the default power class to the supported first power class, and wherein, upon detecting that an information element P-Max indicating the maximum transmission power of the frequency band is included in system information received from the base station prior to establishing an RRC connection with the base station and a value higher than the maximum transmission power of the default power class is set to the P-Max, the controller controls transmission power for transmitting a random access preamble prior to establishing the RRC connection to be less than or equal to a maximum transmission power of the supported first power class by applying a regulation of the supported first power class.

\* \* \* \* \*